(12) United States Patent
Mappes et al.

(10) Patent No.: US 10,983,364 B2
(45) Date of Patent: Apr. 20, 2021

(54) SPECTACLE LENS AND METHOD FOR PRODUCING A SPECTACLE LENS

(71) Applicant: Carl Zeiss Vision International GmbH, Aalen (DE)

(72) Inventors: Timo Mappes, Karlsruhe (DE); Matthias Hornauer, Lauchheim-Hülen (DE); Georg Michels, Aalen (DE); Thomas Glöge, Schorndorf (DE)

(73) Assignee: Carl Zeiss Vision International GmbH, Aalen (DE)

( * ) Notice: Subject to any disclaimer, the term of this patent is extended or adjusted under 35 U.S.C. 154(b) by 123 days.

(21) Appl. No.: 16/532,386

(22) Filed: Aug. 5, 2019

(65) Prior Publication Data

US 2019/0361266 A1 Nov. 28, 2019

Related U.S. Application Data

(63) Continuation of application No. 16/249,871, filed on Jan. 16, 2019, now Pat. No. 10,845,619, which is a
(Continued)

(30) Foreign Application Priority Data

Jul. 19, 2016 (EP) ..................... 16180167

(51) Int. Cl.
*G02C 7/02* (2006.01)
*B29D 11/00* (2006.01)
(Continued)

(52) U.S. Cl.
CPC ........ *G02C 7/022* (2013.01); *B29D 11/00028* (2013.01); *B29D 11/00355* (2013.01);
(Continued)

(58) Field of Classification Search
None
See application file for complete search history.

(56) References Cited

U.S. PATENT DOCUMENTS 4,300,821 A 11/1981 Mignen
5,855,074 A 1/1999 Abitbol et al.
(Continued)

FOREIGN PATENT DOCUMENTS

CN 101681028 A 3/2010
CN 104991353 A 10/2015
(Continued)

OTHER PUBLICATIONS

H.-J. Trost et al., "Using Drop-on-demand Technologies for Manufacturing GRIN Lenses," Proc. 2001 Ann. Mtg. ASPE, Nov. 10-15, 2001 (ASPE, Raleigh, NC 2001) pp. 533-536.
(Continued)

*Primary Examiner* — Darryl J Collins
(74) *Attorney, Agent, or Firm* — Thrive IP®; Georg M. Hasselmann (57) ABSTRACT

A spectacle lens, which is manufactured by additive manufacturing, includes interspersing first volume elements and second volume elements. The first and second volume elements are arranged on the grid points of a geometric grid to form a first sub-grid and a second sub-grid, respectively. The first sub-grid forms the first part of the spectacle lens having a dioptric effect for vision for a first object distance and the second sub-grid forms the second part of the spectacle lens having a dioptric effect for vision for a second object distance, which differs from the first object distance.

17 Claims, 3 Drawing Sheets

Related U.S. Application Data continuation of application No. PCT/EP2017/068241, filed on Jul. 19, 2017.

(51) Int. Cl.
| | | |
|---|---|---|
| *G02C 7/06* | (2006.01) | |
| *B33Y 80/00* | (2015.01) | |
| *B33Y 10/00* | (2015.01) | |
| *B29C 64/112* | (2017.01) | |

(52) U.S. Cl.
CPC ............... *B33Y 80/00* (2014.12); *G02C 7/06* (2013.01); *B29C 64/112* (2017.08); *B33Y 10/00* (2014.12)

(56) References Cited

U.S. PATENT DOCUMENTS

| | | | |
|---|---|---|---|
| 6,103,148 | A | 8/2000 | Su et al. |
| 7,735,998 | B2 | 6/2010 | Volk |
| 7,740,354 | B2 | 6/2010 | Volk |
| 8,425,035 | B2 | 4/2013 | von Blanckenhagen |
| 8,591,026 | B2 | 11/2013 | Conte et al. |
| 9,952,448 | B2 | 4/2018 | Crespo Vazquez et al. |
| 9,957,398 | B2 | 5/2018 | Hugenberg et al. |
| 2007/0115353 | A1 | 5/2007 | Divo et al. |
| 2008/0309063 | A1 | 12/2008 | Zintzmeyer |
| 2011/0043925 | A1* | 2/2011 | Chavel ............... G02F 1/13471 359/665 |
| 2012/0115991 | A1 | 5/2012 | Hugenberg et al. |
| 2015/0153589 | A1 | 6/2015 | Meschenmoser et al. |
| 2015/0277150 | A1 | 10/2015 | Granger et al. |
| 2015/0300912 | A1 | 10/2015 | Allione |
| 2015/0343673 | A1 | 12/2015 | Williams |
| 2016/0161761 | A1 | 6/2016 | Quere et al. |
| 2016/0306192 | A1 | 10/2016 | Marshall et al. |
| 2016/0311184 | A1 | 10/2016 | Gourraud |
| 2016/0341851 | A1 | 11/2016 | Blessing et al. |
| 2017/0131567 | A1 | 5/2017 | To et al. |

FOREIGN PATENT DOCUMENTS

| | | | |
|---|---|---|---|
| CN | 106164753 | A | 11/2016 |
| DE | 3007572 | C2 | 12/1982 |
| DE | 102005059485 | A1 | 8/2006 |
| DE | 102005039113 | A1 | 2/2007 |
| DE | 102008041869 | A1 | 3/2010 |
| DE | 102009004377 | A1 | 7/2010 |
| DE | 102009008997 | A1 | 11/2010 |
| EP | 955147 | A1 | 11/1999 |
| EP | 2385086 | A1 | 11/2011 |
| EP | 2578649 | A1 | 4/2013 |
| EP | 2692941 | A1 | 2/2014 |
| EP | 2878989 | A1 | 6/2015 |
| JP | 02196211 | A | 8/1990 |
| JP | 05313107 | A | 11/1993 |
| JP | 2003029216 | A | 1/2003 |
| JP | 2004157487 | A | 6/2004 |
| JP | 2008191186 | A | 8/2008 |
| KR | 1020140011874 | A | 1/2014 |
| WO | 0155752 | A1 | 8/2001 |
| WO | 2009100257 | A2 | 8/2009 |
| WO | 2010091888 | A1 | 8/2010 |
| WO | 2010109154 | A1 | 9/2010 |
| WO | 2014108364 | A1 | 7/2014 |
| WO | 2014179780 | A1 | 11/2014 |
| WO | 2015004383 | A1 | 1/2015 |
| WO | 2015014381 | A1 | 2/2015 |
| WO | 2015086981 | A1 | 6/2015 |
| WO | 201512938 | A1 | 7/2015 |
| WO | 2015102938 | A1 | 7/2015 |

OTHER PUBLICATIONS

Internet article "Overview of Current 3D Printing Methods," available at: 3druck.com/grundkurs-3d-drucker/teil-2-uebersicht-der-aktuellen-3d-druckverfahren-462146/, relevance found at least in paragraph [0043] of the instant specification and the enclosed machine-translation, last accessed Jan. 13, 2019.

Internet article "Overview of Multijet Modeling," available at: de.wikipedia.org/wiki/Multi_Jet_Modeling, relevance found at least in paragraph [0044] of the instant specification and enclosed machine-translation, last accessed Jan. 13, 2019.

Internet article "What is PolyJet Technology?" available at: www.stratasys.com/polyjet-technology, last accessed Jan. 13, 2019.

Internet article "Poly Jet Printing," available at: https://www.materialise.com/de/manufacturing/3d-druck-technologien/polyjet, relevance found at least in paragraph [0044] of the instant specification, last accessed Jan. 13, 2019.

International Search Report and English-language translation of the European Patent Office issued in PCT/EP2017/068241, to which this application claims priority, dated Nov. 10, 2017.

International Preliminary Examination Report and English-language translation thereof, issued in PCT/EP2017/068241, to which this application claims priority, dated May 21, 2019.

Office action by the Canadian Intellectual Property Office issued in CA 3,031,244, which is a counterpart hereof, dated Mar. 7, 2019.

Office action by the Japanese Patent Office issued in JP 2019-502741, which is a counterpart hereof, dated Jun. 28, 2019, and English-language translation thereof.

Office Action of the Chinese Patent Office dated Sep. 17, 2020 issued in CN 201780057265.7, which is a counterpart hereof, and English-language translation thereof.

Office Action of the Japanese Patent Office dated Sep. 30, 2020 issued in JP 2019-502741, which is a counterpart hereof, and English-language translation thereof.

Office Action of the Indian Patent Office dated Oct. 5, 2020 issued in IN 201917002060, which is a counterpart hereof.

Office Action of the Indonesian Patent Office dated Aug. 10, 2020 issued in ID P00201901434, which is a counterpart hereof, and English-language machine translation thereof.

Office Action of the Japanese Patent Office dated May 28, 2020 issued in JP 2019-502741, which is a counterpart hereof, and English-language translation thereof.

Office Action of the Chinese Patent Office dated Jun. 16, 2020 issued in CN 201780057265.7, which is a counterpart hereof, and English-language translation thereof.

Office Action of the Chinese Patent Office dated Dec. 22, 2020 issued in CN 201780057265.7, which is a counterpart hereof, and English-language translation thereof.

\* cited by examiner

SPECTACLE LENS AND METHOD FOR PRODUCING A SPECTACLE LENS

CROSS REFERENCE TO RELATED APPLICATIONS

This application is a continuation application of United States patent application publication 2019/0146242 A1, filed Jan. 16, 2019, which is a continuation of International application PCT/EP2017/068241, filed Jul. 19, 2017, which claims priority to European patent application EP 16180167.5, filed on Jul. 19, 2016, all of which are hereby incorporated by reference in their entireties.

TECHNICAL FIELD

The disclosure relates to spectacle lenses having a first partial grid and a second partial grid penetrating each other, and a method for producing a spectacle lens having a first partial grid and a second partial grid, such that the partial grids penetrate each other.

BACKGROUND

Spectacle lenses are known in many variations from the related art. There are spectacle lenses without nominal dioptric power and correction spectacle lenses, that is to say spectacle lenses having dioptric power. Dioptric power is the collective term for the focusing and the prismatic power of a spectacle lens.

In the case of correction spectacle lenses, a distinction is drawn between single-vision spectacle lenses and multifocal spectacle lenses. A single-vision spectacle lens is a spectacle lens in which only one dioptric power is present in respect of the design. A multifocal spectacle lens is a spectacle lens in which two or more visibly different parts having different focusing powers are present in respect of the design. Importance is attached in particular to bifocal spectacle lenses, namely multifocal spectacle lenses comprising two parts, usually for distance vision and near vision, and to varifocal spectacle lenses, namely spectacle lenses comprising at least one progressive surface and an increasing (positive) power when the wearer of the spectacles looks down. Degressive spectacle lenses are uncommon, i.e., spectacle lenses comprising at least one progressive surface and a decreasing power (i.e. an attenuation of the power) when the wearer of the spectacles looks down.

What form must be obtained by the spectacle lens to obtain the desired optical correction is decisively determined by the material thereof. Here, the most important parameter is the refractive index of the material. While spectacle lenses were predominantly produced from mineral glasses in the past, in particular crown glasses (Abbe number>55) and flint glasses (Abbe number<50), spectacle lenses from a multiplicity of organic materials have become available in the meantime. Such base materials for organic spectacle lenses are offered, inter alia, under the trade names CR 39, MR 8, MR 7, CR 330 and MR 174. A selection of such base materials is also found in the published specification EP 2692941 A1. Other materials are continuously being tested and developed in respect of the suitability thereof for organic spectacle lenses. Table 1, below, elucidates characteristic variables and reference variables of a selection of known base materials:

TABLE 1

Base materials for the production of spectacle lenses

| Trade name | Base material | Average refractive index $n_e$ | Abbe number $v_e$ |
|---|---|---|---|
| R 39 | Poly allyl diglycol carbonate | 1.500 | 56 |
| CR 330 | | | |
| CR 607 | | | |
| CR 630 | | | |
| Trivex | Polyurea/Polyurethane | 1.530 | 45 |
| PC | Polycarbonate | 1.590 | 29 |
| MR 6 | Polythiourethane | 1.598 | |
| MR 8 | Polythiourethane | 1.598 | 41 |
| MR 7 | Polythiourethane | 1.664 | 32 |
| MR 10 | Polythiourethane | 1.666 | 32 |
| MR 174 | Polyepisulfide | 1.738 | 32 |
| | Mineral 1.5 | 1.525 | 58 |
| | Mineral 1.6 | 1.604 | 44 |

Currently, a large number of organic spectacle lens semifinished products or spectacle lens finished products with spherical, rotationally symmetric aspherical, or progressive front surfaces are cast in mass production in prototypes with front and back surface form shells, which are spaced apart from one another with a sealing ring, forming a cavity in the process, as described in, e.g., the documents DE 30 07 572 C2, U.S. Pat. No. 6,103,148 A, or JP 2008 191186 A. This applies to base materials with the trade names MR 7, MR 8, MR 10 and CR 39, CR 607, CR 630, etc. The base materials with the trade names MR 7, MR 8, and MR 10 are polythiourethanes marketed by Mitsui Chemicals. The abbreviation "MR" here stands for Mitsui Resin. CR 39 or Columbia Resin 39 is the brand name selected by Pittsburgh Plate Glass Industries (PPG Industries) under which the material poly diethylene glycol bis allyl carbonate or poly allyl diglycol carbonate (abbreviation: PADC) is marketed. This is a thermosetting polymer material. CR 607 and CR 630 are also produced by PPG.

Semifinished products or finished products for spectacle lenses made out of polycarbonate are generally produced in metal forms by means of an injection molding technique. This production method is described in, e.g., EP 0955147 A1. A semifinished product is understood to be a spectacle lens blank with surface whose treatment has finished and whose form is no longer modified in further production steps. As a rule, the opposite surface of a semifinished product obtains its final form by means of a material-ablating method. A finished product is a spectacle lens blank in which both surfaces already have obtained their final form.

Mineral spectacle lenses are generally produced by machine-based mechanically abrasive machining of a blank.

The semifinished products or finished products described above are often subjected to one or more finishing processes. In particular, functional layers are applied to one or both sides. Such functional layers are layers which equip the spectacle lenses with predetermined properties, which are advantageous to the spectacle wearer and which the spectacle lenses would not have purely on the basis of the properties of the base or carrier material, onto which the functional layers are applied where necessary, and the forming. In addition to optical properties, such as an antireflection coating, silvering, light polarization, coloring, self-tinting etc., such advantageous properties also include mechanical properties, such as hardening, reduction of the adherence of dirt or reduction in steaming up, etc., and/or electrical properties such as shielding from electromagnetic radiation, conduction of electrical current, etc., and/or other physical or chemical properties. Examples of functional coatings can be gathered from the documents WO 10/109154 A1, WO 01/55752 A1, and DE 10 2008 041 869 A1, for example.

Order-specific prescription spectacle lenses, in particular, individualized single vision and multi-focal lenses, the optical properties of which are not standardized in a preselectable manner, at least in part, but rather are individually calculated and manufactured in a manner adapted to the user in relation to the dimensions and/or the arrangement thereof on the spectacle lens. In particular, varifocal or progressive lenses are brought into their final form by mechanical, in particular deforming and/or abrasive, methods. Here, the outer forms may have a round, oval, or arbitrary shape, describing so-called free-forms in the latter case.

These days, high-quality spectacle lenses with individually adapted dioptric power are produced in a prescription manufacturing site that is designed to this end, a so-called Rx lab (Rx is the abbreviation for recipe), by means of subtractive manufacturing methods from semifinished products (abbreviated HF in German). The finished product is defined by two optical surfaces that have varying distances from one another depending on strength or dioptric power, material and regulations. The two optical surfaces are continuous as a consequence of the generally used free-form manufacturing methods. The exceptions to this rule, the embedded near-region areas in the case of bifocal and trifocal lenses, must already be introduced in the front side during the casting process in the case of polymer lenses. There are also corresponding spectacle lenses with near-region areas formed in protruding fashion on the back side.

The near region and far region are spatially separated from one another in current spectacle lenses with a plurality of strengths or optical powers, namely in the case of bifocal lenses, trifocal lenses and multifocal lenses, in particular varifocal lenses. In particular, this is always bothersome if the spectacle wearer wishes to see in the near region but high in front of the head or in the far region through the lower part of the spectacles.

In terms of design freedom, the current market for spectacle frames is very dependent on the forms and sizes of spectacle lenses that can be supplied by their producers. The diameter and the thickness of the semifinished products which decide whether a spectacle lens can still be manufactured because it fits in the semifinished product—or not, as the case may be—are particularly decisive. Here, the limits of conventional mass production can be significantly expanded because casting of the semifinished products in predetermined shell molds is dispensed with.

In the case of the spectacle lenses currently produced in mass production, the refractive index is uniform and constant independently of location, and so the thickness of the spectacle lens significantly increases toward the edge (in the case of myopic or near-sighted patients) or toward the center (in the case of hyperopic or far-sighted patients) in the case of significant corrections. This is unattractive from a cosmetic point of view, particularly in the first case because the large edge thickness is conspicuous.

The following inherent properties of mass-produced spectacle lenses, which are even present in the case of high-quality products, are perceived as bothersome:

1. The macroscopic spatial separation of near region and far region.
2. The unavoidably occurring astigmatic distortions toward the edge in the case of a smooth transition from the far region into the near region in varifocal lenses according to Minkwitz's theorem.
3. The discontinuous or discontinuously differentiable optical surfaces that are only realizable with significant outlay.
4. The cosmetically unattractive edge, as it is visible, between main lens and segment in the case of non-progressive multifocal lenses, such as in the case of bifocal or trifocal lenses, for example.
5. The unaesthetic large edge thickness, as it is visible, in the case of spectacle lenses with a strong dioptric power; high prism values, in particular, lead to a thick edge of the spectacle lens in the case of myopic humans.
6. The restrictions relating to the producibility of corrective spectacles in the case of form prescriptions for the spectacle lens front surface and/or the spectacle frame that are considered aesthetic; current spectacle lenses are very significantly restricted in view of the outer form as a result of the production method and the shape of the frames and a correspondingly small freedom of design follows therefrom. Within the scope of currently existing restrictions, products such as the NIKE VAPORWING ELITE are practically not producible with optical power, but only as 0 dpt sunglasses.

The related art has disclosed different approaches for improving spectacle lenses in view of the aforementioned properties that are perceived as bothersome. Particularly in this context, it is known that so-called digital fabricators, in particular, offer manufacturing options for virtually any structure, the structures not being realizable or only being realizable with difficulty using conventional abrasive methods. Within the digital fabricator machine class, 3D printers represent the most important subclass of additive, i.e., accumulating, building fabricators. The most important techniques of 3D printing are selective laser melting (SLM) and electron-beam melting for metals and selective laser sintering (SLS) for polymers, ceramics and metals, stereolithography (SLA) and digital light processing for liquid artificial resins and multijet or polyjet modeling (e.g., inkjet printers) and fused deposition modeling (FDM) for plastics and, in part, artificial resins. A few approaches with which transmission optical units are produced with the aid of additive methods are sketched out below.

DE 10 2009 008 997 A1 proposes light-guiding structures that contain a multiplicity of miniaturized elements, proceeding from a reference to spectacle lenses in which portions have different light-refractive power. Each element consists of a multiplicity of droplets made of a light-transmissive or transparent material, the droplets being deposited on a substrate with a plane delimiting surface and the approximately hemispherical arching of the droplets projecting from the substrate. The droplets have different diameters such that each element with the multiplicity of droplets forms a miniaturized partial prism or partial lens or any other particular optical unit. Further, a method for producing light-guiding structures on a light-transmissive or transparent substrate can be gathered from the document. Transparent or translucent printing ink is applied onto the substrate in droplet form by means of inkjet printing. Here, droplets of the same and different size are applied for the purposes of producing miniaturized light-guiding elements, with a plurality of such elements that together form the light-guiding structure such as a prism or a lens being applied next to one another.

WO 2010/091888 A1 also describes an optical element in which light-guiding structures and, in particular, an optical prism are applied to a transparent substrate with the aid of a 3D printing method, namely using a "drop on demand"

inkjet printer (DOD inkjet printer) in particular, and a method for the production thereof. It also states that DE 10 2005 039 113 A1 has already described the application of cylindrical microlenses on a substrate with the aid of a microjet printing method. By way of example, silicone, a mixture of silicone and acrylic, and an epoxy-modified cationic UV curable silicone are proposed as printing material for producing optical elements in WO 2014/108364 A1

Proceeding from a single vision spectacle lens finished product, EP 2 878 989 A1 proposes the production of a progressive spectacle lens with the aid of a 3D printing method.

WO 2015/014381 A1 describes the use of additive manufacturing processes, such as stereolithography (SLA), inkjet printing, selective laser sintering (SLS), selective laser melting (SLM), or fused deposition modeling (FDM) for producing transparent ophthalmic lenses. The document describes the production of such lenses by stringing together volume elements (voxels) with an extent of between 0.1 m and 500 m, which form a three-dimensional grid, in a direction in a predetermined arrangement which, for example, can be defined in a CAD (computer aided design) file. Each volume element (voxel) includes a composition with at least one polymer or pre-polymer or monomer. A connectivity between the volume elements (voxels) is established in each case by forming a chemical or mechanical bond. As suitable polymers, the document specifies polyolefinics such as cyclo olefin polymers, polyacrylates such as polymethyl(meth)acrylate, poly(meth)acrylate, polyethyl (meth)acrylate, polybutyl(meth)acrylate, polyisobutyl (meth)acrylate, polyesters, polyamides, polysiloxanes, polyimides, polyurethanes, polythiourethanes, polycarbonates, polyallylics, polysulfides, polyvinyls, polyarylenes, polyoxides, and polysulfones, or blends thereof. As suitable monomers or pre-polymers, the document specifies olefinics, acrylics, epoxides, organic acids, carboxylic acids, styrenes, isocyanates, alcohols, norbornenes, thiols, amines, amides, anhydrides, allylics, silicones, vinyl esters, vinyl ethers, vinyl halides, and episulfides. The monomers or pre-polymers can be thermally curable or curable in radiation-induced fashion. Photoinitiators and, optionally, co-photoinitiators can be used for radiation-induced curing.

H.-J. Trost et al., Proc. 2001 Ann. Mtg. ASPE, 10-15 Nov. 2001 (ASPE, Raleigh, N.C. 2001) pp. 533-536 propose, for example, the production of spectacle lenses with refractive index gradients, so-called GRIN (gradient index of refraction) spectacle lenses with the aid of drop-on-demand (DOD) technology. This technology is an inkjet printing method in which ink droplets are applied in metered fashion through a nozzle. The desired variation in the refractive index is achieved by using different optical ink materials. After printing, the applied optical ink material is cured thermally or by UV light. The document shows the option of producing lenses with a radial and/or axial refractive index gradient.

WO 2015/102938 A1, too, describes the production of lenses from volume elements (voxels) with the aid of a 3D printing method. Layers with different dielectric materials are stacked and GRIN optical units are produced in this fashion.

Furthermore, WO 2014/179780 A1 describes the production of GRIN optical units by means of 3D printing for the purposes of producing optical GRIN structures with little dispersion. The gradient of the refractive index is produced by way of varying the nanoparticle concentration in the organic matrix. As possible materials for these nanoparticles, $ZnS$, $ZrO_2$, $ZnO$, $BeO$, $AlN$, $TiO_2$, and $SiO_2$ are mentioned. According to the specification in the document, the organic matrix can include, e.g., di(ethylene glycol) diacrylate, neopentyl glycol diacrylate, hexanediol diacrylate, bisphenol A novolak epoxy resin (SU8), 2-hydroxyethylmethacrylate (HEMA), polyacrylate, polymethacrylate, polymethyl methacrylate (PMMA), styrene, and poly[(2,3,4,4,5,5-hexafluorotetrahydrofuran-2,3-diyl)(1,1,2,2-tetrafluoroethylene)] (CYTOP).

Although spectacle lenses that meet the needs of the aesthetical perception of many people can be produced using various methods, there is a need for further improvement.

JP 2004 157487 A describes a bifocal lens that is assembled from a plurality of sets of microlenses. Each of the sets of microlenses has a fixed focus or a fixed refractive index. It is possible to switch between the sets of microlenses with the aid of a liquid crystal arrangement.

JP 2003 029216 A describes reading spectacles. The back surfaces of the spectacle lenses of these reading spectacles have local changes of curvature in the near part and, optionally, in an intermediate region situated between the near part and far apart. There are groups of similarly curved hexagonal back surface segments that are arranged nested in one another. Each of the groups provides a different focal length.

JP H05 313 107 A describes a contact lens that is manufactured from a rod that includes a bundle of fibers. There are a number of groups of fibers. All fibers in one group have the same refractive index. The fibers of different groups differ in terms of their refractive indeces. A microlens in the finished contact lens emerges from each fiber. On account of the production process, the contact lens includes a plurality of groups of microlenses that are arranged nested within one another. Each microlens group provides a focal plane on account of the uniform refractive index within the group, the focal plane differing from the focal plane of every other group.

SUMMARY

It is an object of the disclosure to provide a method for producing a spectacle lens in which there is an improvement in at least one of the aforementioned factors of conventional spectacle lenses that are perceived as bothersome.

This object of the disclosure further includes providing a spectacle lens in which there is an improvement in at least one of the aforementioned factors of conventional spectacle lenses that are perceived as bothersome.

The method-related object is achieved by a method for producing a spectacle lens having a first partial grid and the second partial grid arranged within one another. The product-related object is achieved by a spectacle lens having a first partial grid and the second partial grid arranged within one another.

What is common to all variants according to the disclosure is that the respective spectacle lens comprises at least two volume element groups, namely a first volume element group which comprises a plurality of first volume elements, wherein the plurality of first volume elements are arranged in the style of grid points of a geometric grid so as to form a first partial grid and wherein the first volume elements together form a first part of the spectacle lens, the first part of the spectacle lens having the dioptric power for vision at a first object distance. Further, the spectacle lens comprises a second volume element group, which correspondingly comprises a plurality of second volume elements, wherein the plurality of second volume elements are arranged in the style of grid points of a geometric grid so as to form a second partial grid and wherein the second volume elements together form a second part of the spectacle lens, the second part of the spectacle lens having the dioptric power for vision at a second object distance that differs from the first object distance. In all variants of the spectacle lens according to the disclosure, the first partial grid and the second partial grid are arranged within one another (e.g., displaced or offset), penetrating one another in each case.

In geometry, a grid is a complete and overlap-free partition of a region of the space by a set of grid cells. The grid cells are defined by a set of (fictitious or imaginary) grid points which are interconnected by a set of (fictitious or imaginary) grid lines.

The first and the second partial grid penetrating one another means that the first partial grid and the second partial grid together have a space in common without coinciding in their entirety. Within the scope of the present disclosure, displaced within one another in penetrative fashion means an arrangement in the style of a zinc blend structure, for example, which can be described as a combination of two cubic face-centered partial lattices placed within one another, which are arranged displaced by ¼ of the space diagonal in relation to one another. Additionally, (single-ply) layer lattices, which are displaced in relation to one another by a certain dimension of a vector lying in the layer surface, should also be comprised. The two first and second partial grids need not have identical form either. Rather, what is decisive is that the two first and second partial grids provide no macroscopic spatial separation of the dioptric power for vision at different object distances.

The first part of the spectacle lens, which provides the dioptric power for vision at a first object distance, can correspond to the near region, for example, and the second part of the spectacle lens, which provides the dioptric power for vision at a second object distance, can correspond to the far region of a conventional spectacle lens, for example. Accordingly, the arrangement according to the disclosure of the first and second partial grids provides a three-dimensional structure, in which the far and near regions, as it were, are present virtually nested within one another. Naturally, the first object distance can also be the usual eye-screen distance and the second object distance can be the customary reading distance. Such spectacle lenses are suitable for office work or the like.

Accordingly, the first part and the second part of the spectacle lens represent coinciding surface regions of the spectacle lens, through which the spectacle wearer looks in the case of intended use. Typical surface dimensions of these regions lie between 0.3 $cm^2$ and 7 $cm^2$, typically between 0.5 $cm^2$ and 6 $cm^2$, more typically between 0.8 $cm^2$ and 5 $cm^2$ and, finally, even more typically between 1 $cm^2$ and 4 $cm^2$.

In the case of an exemplary embodiment, the spectacle lens can be distinguished in that
  no visible bifocal or trifocal regions are present,
  there is no need for a progression channel of varifocal spectacles and consequently all individualization parameters connected therewith become obsolete (progression channel length, inset, frame shape, varifocal profile, balance of the image aberration distribution that is unavoidable in the case of conventional varifocal lenses),
  the addition (the difference between the two foci) remains untouched, wherein the number of foci is only restricted by the number of different, individually set voxels (first, second and optional further volume element groups),
  the following parameters, inter alia, can remain untouched: vertex distance (abbreviated HSA in German), pantoscopic tilt and face form angle, provided this is desired.

Untouched means that these parameters such as addition, vertex distance, pantoscopic tilt and face form angle are taken into account when designing the spectacle lenses according to the disclosure in exactly the same way as in the case of conventional spectacle lenses according to the related art.

In addition to these typical applications in the field of varifocal and multifocal lenses, the described exemplary embodiment offers approaches for reducing the cosmetic problems of single vision lenses. To this end, it is possible to introduce the optical correction no longer exclusively by way of the relative position of the optical surfaces with a constant refractive index being taken into account, as is the case in conventional spectacle lenses of the above-described type in the related art.

The volume element groups according to the disclosure are produced with the aid of an additive manufacturing method. Specifically, the method according to the disclosure for producing a spectacle lens comprises the following steps:
  additive manufacturing of a first volume element group, wherein the first volume element group comprises a plurality of first volume elements, wherein the plurality of first volume elements are arranged in the style of grid points of a geometric grid so as to form a first partial grid, wherein the first volume elements together form a first part of the spectacle lens, the first part of the spectacle lens having the dioptric power for vision at a first object distance, and
  additive manufacturing of a second volume element group, wherein the second volume element group comprises a plurality of second volume elements, wherein the plurality of second volume elements are arranged in the style of grid points of a geometric grid so as to form a second partial grid, wherein the second volume elements together form a second part of the spectacle lens, the second part of the spectacle lens having the dioptric power for vision at a second object distance that differs from the first object distance.

According to the disclosure, the method provides that the first partial grid and the second partial grid are arranged within one another (e.g., displaced or offset), penetrating one another in each case, during the additive manufacturing.

The method steps of additive manufacturing of the first volume element group and additive manufacturing of the second volume element group should not necessitate the first volume element group being completed first and the second volume element group being completed thereafter. Rather, one or more volume elements of the first volume element group can be initially produced additively, followed in turn by one or more volume elements of the second volume element group, then by one or more volume elements of the first volume element group again, etc., until the two volume element groups are completed in the arrangement according to the disclosure in a manner corresponding to two partial grids displaced within one another in penetrative fashion.

Additive manufacturing (AM), or additive manufacturing methods, is a comprehensive label for the methods, previously often referred to as rapid prototyping, for fast and cost-effective manufacture of models, patterns, prototypes, tools, and end products. This manufacture is implemented directly on the basis of computer-internal data models from formless (e.g., liquids, powder, and the like) or form-neutral (band-shaped, wire-shaped) material by means of chemical and/or physical processes. Although these are primary forming methods, no special tools that have stored the respective geometry of the workpiece (e.g., molds) are required for a specific product. The current related art is conveyed by the VDI Statusreport AM 2014. An overview of current 3D printing methods is provided by 3druck.com/grundkurs-3d-drucker/teil-2-ueb ersicht-der-aktuellen-3d-druckverfahren-462146/, last accessed Jan. 13, 2019.

The method of multijet modeling or polyjet printing was found to be particularly suitable. This method is described, for example, at the URL de.wikipedia.org/wiki/Multi_Jet_Modeling, the URL www.materialise.com/de/manufacturing/3d-druck-technologien/polyjet, or the URL www.stratasys.com/polyjet-technology, respectively retrieved on Jan. 13, 2019. Polyjet is a powerful 3D printing technology, by means of which smooth, precise components, prototypes and production aids can be produced. Thanks to microscopic layer resolution and an accuracy of up to 0.1 mm, thin walls and complex geometries can be produced thereby from the most comprehensive spectrum of materials available for each technology. The polyj et 3D printer has a similar operation to that of an inkjet printer. However, instead of spraying ink droplets onto paper, polyjet 3D printers spray layers made of a crosslinkable, liquid photopolymer onto a construction platform. The method is comparatively simple: In a first preparation step, the preparation software automatically calculates the placement of the photopolymer and of the support material (i.e., a material that only serves during the 3D printing for positioning and supporting the photopolymer until the latter is cured) on the basis of a 3D CAD file. During the actual production, the 3D printer sprays tiny droplets of liquid photopolymer and immediately crosslinks these by means of UV light. Thus, fine layers accumulate on the building platform, one or more precise 3D models or 3D parts arising therefrom. If overhanging or complex forms have to be supported, the 3D printer sprays a removable support material. The user can easily remove the support material by hand, with water or in a solvent bath. The models and components can typically be processed and used directly from the 3D printer, without having to post-harden.

The Stratasys (Objet) Eden 260 V 3D printer, in particular, is suitable for the application according to the disclosure. The materials referred to above in the introductory part of the description and, in particular, specified in documents WO 2014/179780 A1 and WO 2015/014381 A1 are suitable for use in the method according to the disclosure. By way of example, suitable polymers for the first and second volume elements are polyolefinics such as cyclo olefin polymers, polyacrylates such as polymethyl(meth)acrylate, poly(meth)acrylate, polyethyl(meth)acrylate, polybutyl(meth)acrylate, polyi sobutyl(meth)acrylate, polyesters, polyamides, polysiloxanes, polyimides, polyurethanes, polythiourethanes, polycarbonates, polyallylics, polysulfides, polyvinyls, polyarylenes, polyoxides, and polysulfones, and blends thereof. Olefinics, acrylics, epoxides, organic acids, carboxylic acids, styrenes, isocyanates, alcohols, norbornenes, thiols, amines, amides, anhydrides, allylics, silicones, vinyl esters, vinyl ethers, vinyl halides, and episulfides can be considered to be monomers or pre-polymers that are suitable as printed material for producing the first and second volume elements. The monomers or pre-polymers can be thermally curable or curable in radiation-induced fashion. Photoinitiators and, optional, co-photoinitiators can be used for radiation-induced curing.

As described above, the first and second volume elements can also consist of an organic matrix to which nanoparticles have been added. The organic matrix can consist of, e.g., di(ethylene glycol)diacrylate, neopentyl glycol diacrylate, hexanediol diacrylate, bisphenol A novolak epoxy resin (SU8), 2-hydroxyethylmethacrylate (HEMA), polyacrylate, polymethacrylates, polymethyl methacrylate (PMMA), styrene, and poly[(2,3,4,4,5,5-hexafluorotetrahydrofuran-2,3-diyl)(1,1,2,2-tetrafluoroethylene)] (CYTOP). Possible materials for the nanoparticles are $ZnS$, $ZrO_2$, $ZnO$, $BeO$, $AlN$, $TiO_2$, and $SiO_2$, for example.

The method-specific problem presented at the outset is solved in its entirety by such a method according to the disclosure for producing a spectacle lens.

With these words, reference is made to the fact that the disclosure is not restricted to only a penetrative arrangement of two partial grids. Rather, it is also possible to realize more than two partial grids for corresponding different object distances. However, it was found to be advantageous to restrict the number of different partial grids to no more than 5, typically no more than four or else no more than 3 because the human brain otherwise does not allow focused perception, or only allows so with difficulties.

The product-related problem specified above can be solved by one of the exemplary embodiments specified below: the starting product is always a spectacle lens having the features specified below:

The spectacle lens according to the disclosure comprises a first volume element group which includes a plurality of first volume elements, wherein the plurality of first volume elements are arranged in the style of grid points of a geometric grid so as to form a first partial grid and wherein the first volume elements together form a first part of the spectacle lens, the first part of the spectacle lens having the dioptric power for vision at a first object distance. Further, the spectacle lens comprises a second volume element group, which correspondingly includes a plurality of second volume elements, wherein the plurality of second volume elements is arranged in the style of grid points of a geometric grid so as to form a second partial grid and wherein the second volume elements together form a second part of the spectacle lens, the second part of the spectacle lens having the dioptric power for vision at a second object distance that differs from the first object distance. The first partial grid and the second partial grid are arranged within one another (e.g., displaced or offset), penetrating one another in each case.

The first variant of the disclosure includes the first partial grid having a three-dimensional embodiment and/or the second partial grid having a three-dimensional embodiment. There is an interaction that increases with the number of layers between the first and second parts as a result of the three-dimensional design of one or both partial grids, the interaction intending to be designed for in-focus vision at different object distances. Details are explained below in conjunction with the description relating to FIG. 4. However, what is achieved in principle is that light on its passage through the spectacle lens is not only refracted twice, at the front surface and back surface, but refracted repeatedly at each interface between the partial grids, albeit by smaller angle in each case. Consequently, it is possible to optimize the light path through the spectacle lens individually, tailored to the user. Here, the light path can be influenced at the local level and relatively large light beams, which remain tightly connected in conventional systems, can be split and controlled more precisely in smaller beams.

The second variant of the disclosure assumes that the first volume elements each have a first surface element and the second volume elements each have a second surface element. Here, a surface element should be understood to mean an optical surface through which light beams emanating from an object have to pass in order to reach the eye. All surface elements that together form the front or back surface of the spectacle lens are special cases. This front or back surface and, accordingly, also the surface elements forming these may optionally also be coated. The surface elements can also form internal interfaces to a carrier or to surface elements of other volume elements.

Figures 5A, 5B:
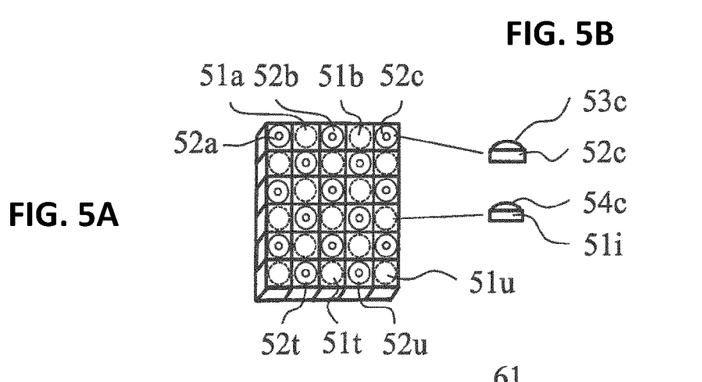
FIG. 5A shows a fourth exemplary embodiment for the arrangement of the volume elements of two partial grids formed by these volume elements of the first and second volume element groups, displaced within one another in penetrative fashion.
FIG. 5B shows a magnified illustration of in each case one of the first and second volume elements in FIG. 5A.

This second variant of the disclosure is characterized in that respectively one of the first surface elements of the first volume elements of the first volume element group and respectively one of the second surface elements of the second volume elements of the second volume element group, which adjoin one another, are arranged at an angle to one another or arranged so as to form a step. Details are explained below in conjunction with the description relating to FIG. 5. However, what is achieved in principle is that two volume element groups with different focal spots are realized within a physically contiguous spectacle lens and that no bifocal lenses with their clearly visible edge in the visual field are required. Moreover, it is possible to dispense with the progression channel of the varifocal lenses which, with its continuous change of the optical power, necessarily has astigmatic distortions at the edge of the spectacle lens as a consequence. As a result, small edges arise between the surfaces of the volume element groups, the edges being significantly less conspicuous to the observer than known solutions.

The third variant of the disclosure proceeds from the two following configurations, which may also be present cumulatively:
 (i) the first volume elements each have a first surface element of the above-described type and the second volume elements accordingly each have a second surface element, and
 (ii) the first volume elements consist of a first material and the second volume elements consist of a second material that differs from the first material.

According to the disclosure, provision is made for a transition between one of the first volume elements and an adjoining one of the second volume elements to be implemented by gradual change in the material and/or by gradual change of an orientation of the respectively adjoining first and second surface elements of the adjoining first and second volume elements. While there is a jump from one focus to the next in the second variant of the disclosure, this change is implemented gradually, as a rule, in the third variant of the disclosure. Further details are summarized in the last four portions of the description. However, what is achieved in principle is that the remaining edges in the optically effective surface, as can be observed in the third variant, can be reduced further in this embodiment and hence further improvements are obtained in the cosmetic properties. Additionally, gradual changes between the volume element groups lead to a reduced formation of stray light at the various interfaces between the volume element groups. Calculating the individual volume element groups and setting the respective refractive indices is significantly more complicated than in the second variant, and so more computational power must be available for the design.

The fourth variant includes a smoothing hard coat being arranged on the first volume element group and the second volume element group. A smoothing hard coat is understood to mean a layer that reduces the surface roughness and surface structures of the spectacle lens substrate.

With this smoothing hard coat, the spectacle lens typically has a surface roughness Ra of <10 nm. More typically, the surface roughness Ra of the spectacle lens over all optical surfaces in each case lies in a range of 1.0 nm to 8.0 nm, more typically in a range of 3.0 nm to 7.0 nm and very more typically in a range of 4.0 nm to 6.0 nm. The aforementioned values for the surface roughness Ra in each case related to the front surface and back surface of the spectacle lens. The surface roughness Ra in relation to the completed spectacle lens is typically determined by means of white-light interferometry, typically using the NewView 7100 (Zygo Corporation) appliance.

The composition of the smoothing hard coat can contain at least one silane derivative $(R^4O)Si(OR^1)(OR^2)(OR^3)$, wherein $R^1$, $R^2$, $R^3$, $R^4$ can be the same or different from one another, substituted or unsubstituted and $R^1$, $R^2$, $R^3$, $R^4$ can be selected from the group consisting of alkyl, acyl, alkyleneacyl, cycloalkyl, aryl, and alkylenearyl. Alternatively or additionally, the composition of the smoothing hard coat can contain at least one silane derivative $R^6R^7_{3-n}Si(OR^5)_n$, wherein $R^5$ can be selected from the group consisting of alkyl, acyl, alkyleneacyl, cycloalkyl, aryl, and alkylenearyl, $R^5$ can be substituted or unsubstituted, $R^6$ is an organic radical, which comprises an epoxide group, $R^7$ can be selected from the group consisting of alkyl, cycloalkyl, aryl and alkenylaryl, $R^7$ can be substituted or unsubstituted. Further examples of such smoothing hard coats can be found in EP 2 578 649 A1, DE 10 2005 059 485 A1 and EP 2 385 086 A1. In principle, this renders the structure consisting of different volume elements to be inconspicuous or less conspicuous to the observer from the outside while the spectacle lens is provided with scratch resistance. The cosmetic smoothing properties of this variant are particularly important if the optical system is based on the parameters with sharp edges and jump-like changes described in variant number two. A further advantage lies in the improved cleanability of the coated surface since fewer trenches, in which dirt can accumulate, are present. Compared to the uncoated variant, further advantages arise within the scope of applying a stamp figure (centering cross, measurement circles, etc.), which, optionally, can further be printed onto the spectacle lens surface by pad printing or inkjet printing methods.

The fifth variant of the disclosure is characterized in that the first volume element group and the second volume element group are arranged on a surface of a carrier that has a (spatial) refractive index gradient. As described in the introductory part of the description, a refraction gradient offers the possibility of producing a desired dioptric power of a body that has little dependence on the geometric form thereof. This allows the spectacle lens to have a thinner embodiment overall than if use were made of a carrier with a spatially constant refractive index. In a region in which the first volume element group and the second volume element are arranged, the thickness of the carrier is typically between 0.1 and 5 mm, more typically between 0.5 and 3 mm, and even more typically between 1 and 2 mm.

The product-related problem posed at the outset is solved in its entirety by each of the above-described five variants.

The variants of the disclosure described below also can be combined in any way, as illustrated in detail below in an exemplary fashion.

In principle, it is possible for the first and second volume elements to be made of the same material. The provision of different dioptric powers for sharp vision at different object distances is then determined or set by the respective surface geometry of the individual first and second volume elements, and/or the relative position and alignment of the individual first and second volume elements in relation to one another, and/or the external geometry of the grid comprising the two first and second partial grids. Firstly, the term surface geometry comprises both surface area and surface form, in particular also the local curvature of the surface of the respective volume element.

According to the explanations made above, it is alternatively possible for the first volume elements to be made of a first material and for the second volume elements to be made of a second material that differs from the first material. The provision of different dioptric powers for sharp vision at different object distances then can be determined or set not only by the respective surface geometry of the individual first and second volume elements, and/or the relative position and alignment of the individual first and second volume elements in relation to one another, and/or the external geometry of the grid comprising the two first and second partial grids, but also by the different light-refractive properties of the respective first and second volume elements. Particularly when the first material has a first refractive index and the second material has a second refractive index that differs from the first refractive index, it is not only the orientation of the optically effective surfaces of the volume elements that play a role, but also the refractive powers thereof. The restriction of the forming in respect of an aesthetic perception is largely removed or at least significantly reduced in comparison with conventional spectacle lenses. The use of an additive manufacturing method, in particular the use of the multijet or polyjet printing/modeling allows the realization of discontinuous and/or discontinuously differentiable optical surfaces with little outlay. The macroscopic spatial separation of, for example, near and far region (in general: a first object distance range and a second object distance range) is dispensed with and, connected therewith, the astigmatic distortions occurring toward the edge in the case of varifocal lenses of the conventional type are dispensed with.

If use is made of materials with different refractive indices for realizing the first and second volume elements, it is possible to produce the dioptric powers for the different object distances by arranging the first and second volume elements so that these together yield a smooth, optionally even plane surface which, when the spectacle lenses or the spectacles with the spectacle lens according to the disclosure are used as intended, is aligned either in the direction of the object (i.e., optionally provided with a coat, forming the front surface of the spectacle lens) and/or in the direction of the eye (i.e., optionally, provided with a coat, forming the back surface of the spectacle lens). By contrast, if use is made of materials with the same refractive indices or if use is even made of identical materials for the purposes of realizing the first and second volume elements, the surfaces of the first and second volume elements will have different orientations in relation to one another at the locations at which two different volume elements adjoin one another to obtain the property according to the disclosure of providing a macroscopic spatial unification of the regions for different object distances. In particular, in this case, the disclosure can be described in that the first volume elements each have a first surface element and in that the second volume elements each have a second surface element and in that respectively one of the first surface elements and respectively one of the second surface elements, which adjoin one another, are arranged at an angle to one another.

To summarize, the transition between a first volume element and a second volume element can be implemented in discontinuous fashion by way of a jump-like change in the material and/or jump-like change in the orientation of the respective surface elements, adjoining one another, of neighboring volume elements.

As an alternative, the transition between a first volume element and a second neighboring volume element can also be implemented in a gradual or smooth fashion, with similar properties to the progression channel in conventional varifocal lenses. This can be implemented accordingly by a gradual change in the material and/or a gradual change in the orientation of the respective optical surface of the neighboring volume elements.

The first partial grid can have a two-dimensional embodiment. As an alternative or in addition thereto, the second partial grid can have a two-dimensional embodiment. Within the scope of the present application, a two-dimensional embodiment of a (partial) grid should be understood to mean a single-ply layer grid. Expressed differently, all volume elements forming the (partial) grid should lie in a plane. In the case where both partial grids have a two-dimensional shape, it is possible that a grid comprising the first partial grid and the second partial grid once again forms a two-dimensional grid, namely if the two partial grids are displaced in relation to one another in the above-described plane. By way of example, the two partial grids can be present in the style of a checkerboard-like structure, in which the light squares of the checkerboard are imagined to correspond to the first volume elements of the first partial grid and the dark squares of the checkerboard are imagined to correspond to the second volume elements.

Even if both the first partial grid and the second partial grid have a two-dimensional shape, these need not necessarily be displaced in relation to one another in the plane in which the volume elements are arranged. A displacement of the two partial grids in relation to one another both in a direction aligned exclusively perpendicular to this plane and in any spatial direction are possible.

The first partial grid can also have a three-dimensional shape. As an alternative or in addition thereto, the second partial grid can also have a three-dimensional shape. Once again, the two partial grids can be displaced in any spatial direction in relation to one another. Particularly in the case of a three-dimensional shape, the foci for the two different object distances will influence one another with each layer. Expressed differently, there will be an interaction that increases with the number of layers between the first and second parts in the case of the three-dimensional design of the partial grids, the interaction intending to be designed for in-focus vision at different object distances. Details are explained below in conjunction with the description relating to FIG. 4.

The first object distance can differ from the second object distance by more than 5 cm or by more than 10 cm or by more than 15 cm or by more than 20 cm or by more than 30 cm or even by more than 50 cm, for example. Expressed differently, the focal planes for which the parts comprising the first and second volume elements are designed in each case are spaced apart from one another by the values specified above. The spectacle wearer is able to see objects arranged in these focal planes in focus along the same viewing direction. A change of view, as required in conventional multifocal lenses, is not required with the aid of a spectacle lens of the type according to the disclosure.

In principle, it is possible that the spectacle lens only consists of, or is only formed by, the first and second volume element groups. It is also possible that one or more further volume element groups of the type corresponding to the first and second volume element groups are present and that the spectacle lens only consists of these volume element groups of different types, which each form parts of the spectacle lens that provide the dioptric power for vision for the same or different object distances. A particularly advantageous embodiment variant of the spectacle lens according to the disclosure is characterized in that the first volume element group and the second volume element group are arranged on a surface of a carrier. By way of example, the carrier could have been produced with the aid of a method such as casting or an abrasive method from a blank. However, the disclosure also provides for the method according to the disclosure optionally to be characterized by the method step of additive manufacturing of a carrier with a surface, on which the first volume element group and the second volume element group are arranged.

By way of example, the carrier can have an object-side spherical or toric or free-form surface and the surface on which the first volume element group and the second volume element group are arranged can be the eye-side surface of the carrier. Alternatively, the carrier can also have an eye-side spherical or toric or free-form surface and the surface on which the first volume element group and the second volume element group are arranged can be the object-side surface of the carrier. In both of the above-described variants, the overall effect of the spectacle lens is composed of the refractive power of the spherical or toric or rotationally symmetrical aspherical or free-form surface and the light-refractive properties of the volume elements of the first and the second volume element groups.

Finally, it is also possible that the surface on which the first volume element group and the second volume element group are arranged is/are the eye-side and/or the object-side surface of the carrier. Then, the overall effect of the spectacle lenses is substantially composed of the light-refractive properties of the volume elements of the first and the second volume element groups.

Further, it is possible for the carrier to have a refractive index gradient. As described in the introductory part of the description, a refraction gradient offers the possibility of producing a desired dioptric power of a body that has little dependence on the geometric form thereof.

Additionally, a coat can be arranged on the first volume element group and the second volume group. In particular, all functional layer structures mentioned in the introductory part of the description can be provided as coats. In particular, mention should be made to those coats that influence or change optical properties, such as an antireflection coating, silvering, light polarization, coloring, self-tinting etc., and mechanical properties, such as hardening, reduction of the adherence of dirt or reduction in steaming up, etc., and/or electrical properties such as shielding from electromagnetic radiation, conduction of electrical current, etc., and/or other physical or chemical properties of the spectacle lens.

Finally, it is also possible that the first volume element group and the second volume element group are formed as buried structures. On the one hand, this substantially simplifies a subsequent hard or antireflection coating (e.g., conventional smoothing hard coat systems can be used) and on the other hand discontinuities or bends or jumps in the surfaces of the volume elements adjoining one another do not form cavities for the subsequent collection of dirt on the surface of the completed spectacle lens. Buried structures are understood to mean structures embedded in a substrate material.

The above-described dioptric power of the spectacle lens according to the disclosure can be obtained with first volume elements that each have a volume of between 1000 $\mu m^3$ and 1 $mm^3$ and/or with second volume elements that each have a volume of between 1000 $\mu m^3$ and 1 $mm^3$. The smallest possible volume of the volume element is predetermined by the production method, for example by the droplet size in the case of the multijet or polyjet modeling and, for example, by the focus dimension of the laser in the SLA method.

By way of example, the first volume elements could each have an object-side surface of between 100 $\mu m^2$ and 1 $mm^2$ and/or the second volume elements could each have an object-side surface of between 100 $\mu m^2$ and 1 $mm^2$. As an alternative or in addition thereto, it is possible for the first volume elements to each have an eye-side surface of between 100 $\mu m^2$ and 1 $mm^2$ and/or for the second volume elements to each have an eye-side surface of between 100 $\mu m^2$ and 1 $mm^2$.

The number of first volume elements, which form the first part, typically lies between 50 and $10^9$, more typically between 100 and $10^8$, even more typically between 200 and $10^7$ and particularly typically between 500 and $10^6$.

The number of second volume elements, which form the second part, typically lies between 50 and $10^9$, more typically between 100 and $10^8$, even more typically between 200 and $10^7$ and particularly typically between 500 and $10^6$.

Typically, the number of first volume elements and number of second volume elements are of the same order of magnitude. This means that the number of the first volume elements and the number of the second volume elements do not deviate from one another by more than a factor of 10, typically by no more than a factor of 8, more typically by no more than a factor of 5 and even more typically by no more than a factor of 2.

The technological solution according to the disclosure has the following advantages, particularly when taking into account the above-presented advantageous embodiments and developments of the inventive concept:

In addition to the above-described applications in the field of varifocal and multifocal lenses and the likewise above-described approaches of reducing the cosmetic problems, particularly in the case a single vision lenses, it is moreover possible to select systems not purely based on a gradient optics (see the aforementioned publications WO 2015/102938 A1 and WO 2014/179780 A1), in which plane lenses or even physically plane plates are generated as a spectacle lens. A very good result emerges from an expedient combination of optically active surfaces with a refractive index gradient in the substrate material. If the refractive index increases towards the edge of the spectacle lens, it is possible to reduce the edge thickness of the spectacle lens when correcting myopic eye defects. If plastics are used, the maximum refractive index lift is from 1.48 to 1.80, wherein the realizability is difficult as a result of the necessary change of the underlying chemistry. Mineral glass offers further possibilities of improvement.

Various restrictions of current technology are lifted in view of the design of the spectacle lens. Lifting of the restriction to spherical or aspherical rotationally symmetric front surfaces with a restricted delivery range in view of the curvature is particularly advantageous. When the technologies described here are used, it is possible to realize any curvature and changes in curvature with or without consequence for the optical power of the lens. If desired, the change in curvature can be compensated by a change in the refractive index.

A further advantageous property is the lifting of the size restriction of the spectacle lens as a result of the restriction to the diameter of the available semifinished products. Unlike in the case of the semifinished products which, for reasons of production, are restricted to a diameter of approximately 80 to 90 mm, the maximum size of the construction space of the 3D printer, which already lies significantly thereabove and may advantageously be more than 200×200×200 mm, represents the production limit. If this volume is exploited, it would be possible to print whole spectacles, shields, etc. in one piece.

BRIEF DESCRIPTION OF THE DRAWINGS

The disclosure will now be described with reference to the drawings wherein.

DESCRIPTION OF EXEMPLARY EMBODIMENTS

Explanations were given above that the spectacle lens according to the disclosure comprises at least two volume element groups. The two volume element groups, referred to as first and second volume element groups below, each comprise a plurality of corresponding volume elements. The volume elements of the first volume element group are referred to as first volume elements below; the volume elements of the second volume element group are referred to as second volume elements below.

The first volume elements are arranged in the style of grid points of a geometric grid and form a first partial grid. Together, the volume elements of the first volume element group form a first part of the spectacle lens. Together, they define a region of the spectacle lens through which the spectacle wearer gazes in the case of intended use, the region having the dioptric power for vision at a first object distance.

The second volume elements are likewise arranged in the style of grid points of a geometric grid and together form a second partial grid in their own right. Together, the volume elements of the second volume element group form a second part of the spectacle lens. Together, they define a region of the spectacle lens through which the spectacle wearer gazes in the case of intended use, the region having the dioptric power for vision at a second object distance, the second object distance deviating from the aforementioned first object distance that is set by the first partial grid formed by the volume elements of the first volume element group.

The first partial grid and the second partial grid are arranged displaced within one another in penetrative fashion in each case. As a result, the regions of the spectacle lens that are defined by the two partial grids respectively formed from different volume elements and that are designed for different object distances geometrically coincide on a macroscopic level. This should be elucidated once again below on the basis of the figures.

Figures 1, 2:
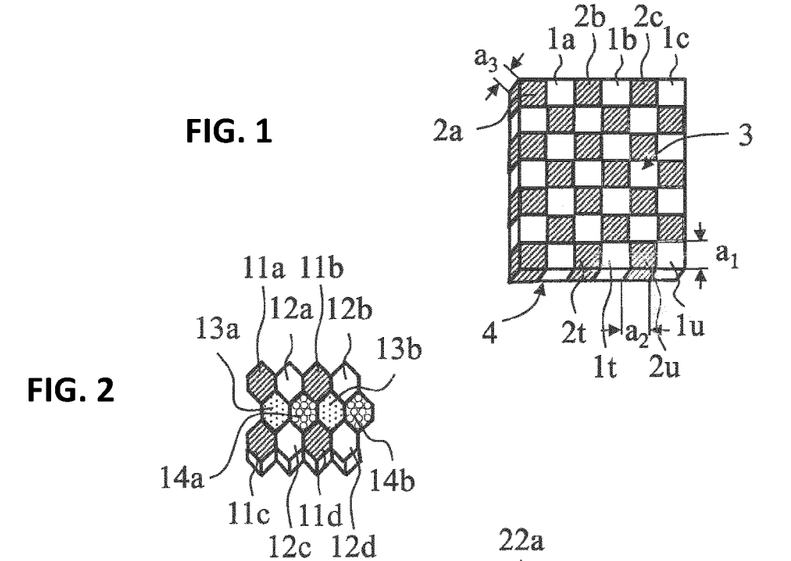
FIG. 1 shows a first exemplary embodiment for the arrangement of two partial grids formed by volume elements of the first and second volume element groups, displaced within one another in penetrative fashion.
FIG. 2 shows an exemplary embodiment for the arrangement of four partial grids formed by volume elements of the first, second, third, and fourth volume element groups, displaced within one another in penetrative fashion.

FIG. 1 shows a first exemplary embodiment for the arrangement of two partial grids formed by volume elements of the first and second volume element groups, displaced within one another in penetrative fashion. In the present exemplary embodiment, the first partial grid includes cuboid volume elements $1a$, $1b$, $1c$ ... $1t$, $1u$, which are arranged like the white fields of a checkerboard. In the present exemplary embodiment, the second partial grid includes cuboid volume elements $2a$, $2b$, $2c$ ... $2t$, $2u$, which are arranged like the black fields of a checkerboard. Each cuboid volume element $1a$, $1b$, $1c$ ... $1t$, $1u$, $2a$, $2b$, $2c$ ... $2t$, $2u$ takes up the same amount of space, with edge lengths $a_1$, $a_2$, $a_3$. The edge lengths $a_1$, $a_2$, $a_3$ regularly lie in the range between 10 μm and 1 mm. The volumes of the cuboid volume elements $1a$, $1b$, $1c$ ... $1t$, $1u$, $2a$, $2b$, $2c$ ... $2t$, $2u$ are then in the range between 1000 $\mu m^3$ and 1 $mm^3$.

In the present exemplary embodiment, the first partial grid that is based on the cuboid volume elements $1a$, $1b$, $1c$ ... $1t$, $1u$ and the second partial grid that is based on the cuboid volume elements $2a$, $2b$, $2c$ ... $2t$, $2u$ have an identical shape. From a geometric point of view, the two partial grids are offset in relation to one another by the edge length $a_1$ in the direction of a sheet row. Alternatively, it is also possible to say that the two partial grids are offset in relation to one another by the edge length $a_2$ in a direction perpendicular to the direction of a sheet row. In this exemplary embodiment, both partial grids lie in one plane. In the present case, let the surface 3 visible in FIG. 1 be the surface facing the object in the case of an intended use of the spectacle lens, which is based on the structure shown in FIG. 1. Accordingly, the surface 4 that is not visible in FIG. 1 in that case is the surface facing the eye of the spectacle wearer in the case of an intended use of the spectacle lens. The object-side surface of a single volume element $1a$, $1b$, $1c$ ... $1t$, $1u$, $2a$, $2b$, $2c$ ... $2t$, $2u$, which in each case represents a plane surface in the present exemplary embodiment, lies between 100 $\mu m^2$ and 1 $mm^2$, taking into account the aforementioned size specifications.

The part of the spectacle lens defined by the first partial grid is determined by the totality of the volumes of the cuboid volume elements $1a$, $1b$, $1c$ ... $1t$, $1u$ in the present exemplary embodiment. Expressed differently, the region of the spectacle lens defined by the first partial grid, which is designed for vision at a first object distance and through which the spectacle wearer gazes for the purposes of seeing an object arranged at this distance in focus in the case of intended use, is determined in the present exemplary embodiment by the totality of the object-side (and eye-side) surfaces of the cuboid volume elements $1a, 1b, 1c \ldots 1t, 1u$. According to the disclosure, this surface region is between 0.3 cm$^2$ and 7 cm$^2$, typically between 0.5 cm$^2$ and 6 cm$^2$, more typically between 0.8 cm$^2$ and 5 cm$^2$ and, finally, even more typically between 1 cm$^2$ and 4 cm$^2$.

The part of the spectacle lens defined by the second partial grid is determined by the totality of the volumes of the cuboid volume elements $2a, 2b, 2c \ldots 2t, 2u$ in the present exemplary embodiment. Expressed differently, the region of the spectacle lens defined by the second partial grid, which is designed for vision at a second object distance and through which the spectacle wearer gazes for the purposes of seeing an object arranged at this distance in focus in the case of intended use, is determined in the present exemplary embodiment by the totality of the object-side (and eye-side) surfaces of the cuboid volume elements $2a, 2b, 2c \ldots 2t, 2u$. According to the disclosure, this surface region is between 0.3 cm$^2$ and 7 cm$^2$, typically between 0.5 cm$^2$ and 6 cm$^2$, more typically between 0.8 cm$^2$ and 5 cm$^2$ and, finally, even more typically between 1 cm$^2$ and 4 cm$^2$.

From a macroscopic point of view, the surface region defined by the first partial grid and the surface region defined by the second partial grid coincide, and so there is no macroscopic separation between the part of the spectacle lens designed for the first object distance and the part of the spectacle lens designed for the second object distance. In contrast to the conventional type of bifocal or varifocal lens that is designed for a presbyopic wearer, near and far part coincide from the macroscopic point of view.

By way of example, WO 2015/102938 A1 describes in detail how such grid structures are produced. Thus, a 3D printer equipped with one or more processors receives a CAD model with data of, in the present exemplary embodiment, a single layer which comprises a multiplicity of volume elements. Thus, the data contain, for example, the information that the first volume elements $1a, 1b, 1c \ldots 1t, 1u$, specified above, should be manufactured from a first material with a first dielectric constant, corresponding to a first printer ink, and the information that the second volume elements $2a, 2b, 2c \ldots 2t, 2u$, specified above, should be manufactured from a second material with a second dielectric constant, corresponding to a second printer ink. From the data, the processor or processors of the 3D printer calculate the respective location at which the respective printer ink should be placed, the temperature and/or the UV light requirements and the corresponding times to cure the placed printer ink for the purposes of generating the respective volume element $1a, 1b, 1c \ldots 1t, 1u, 2a, 2b, 2c \ldots 2t, 2u$.

FIG. 2 shows a further exemplary embodiment for the arrangement of volume elements of partial grids, displaced within one another in penetrative fashion. In this exemplary embodiment, the overall grid is formed from four partial grids. The four partial grids comprise volume elements of the first, second, third, and fourth volume element groups. The first partial grid, which is based on the hexagonal volume elements $11a, 11b, 11c, 11d$, the second partial grid, which is based in the hexagonal volume elements $12a, 12b, 12c, 12d$, the third partial grid, which is based on the hexagonal volume elements $13a, 13b$, and the fourth partial grid, which is based on the hexagonal volume elements $14a, 14b$, have an identical shape in the present exemplary embodiment. The volumes of the hexagonal volume elements $11a, 11b, 11c, 11d, 12a, 12b, 12c, 12d, 13a, 13b, 14a, 14b$ are in the range of between 1000 µm$^3$ and 1 mm$^3$.

The part of the spectacle lens defined by the first partial grid is determined by the totality of the volumes of the volume elements $11a, 11b, 11c, 11d$ in the present exemplary embodiment. Expressed differently, the region of the spectacle lens defined by the first partial grid, which is configured for vision at a first object distance and through which the spectacle wearer gazes for the purposes of seeing an object arranged at this distance in focus in the case of intended use, is determined in the present exemplary embodiment by the totality of the object-side (and eye-side) surfaces of the volume elements $11a, 11b, 11c, 11d$. According to the disclosure, this surface region is between 0.3 cm$^2$ and 7 cm$^2$, typically between 0.5 cm$^2$ and 6 cm$^2$, more typically between 0.8 cm$^2$ and 5 cm$^2$ and, finally, even more typically between 1 cm$^2$ and 4 cm$^2$.

The part of the spectacle lens defined by the second partial grid is determined by the totality of the volumes of the volume elements $12a, 12b, 12c, 12d$ in the present exemplary embodiment. Expressed differently, the region of the spectacle lens defined by the second partial grid, which is designed for vision at a second object distance and through which the spectacle wearer gazes for the purposes of seeing an object arranged at this distance in focus in the case of intended use, is determined in the present exemplary embodiment by the totality of the object-side (and eye-side) surfaces of the volume elements $12a, 12b, 12c, 12d$. According to the disclosure, this surface region is between 0.3 cm$^2$ and 7 cm$^2$, typically between 0.5 cm$^2$ and 6 cm$^2$, more typically between 0.8 cm$^2$ and 5 cm$^2$ and, finally, even more typically between 1 cm$^2$ and 4 cm$^2$.

The part of the spectacle lens defined by the third partial grid is determined by the totality of the volumes of the volume elements $13a, 13b$ in the present exemplary embodiment. Expressed differently, the region of the spectacle lens defined by the third partial grid, which is designed for vision at a third object distance and through which the spectacle wearer gazes for the purposes of seeing an object arranged at this distance in focus in the case of intended use, is determined in the present exemplary embodiment by the totality of the object-side (and eye-side) surfaces of the volume elements $13a, 13b$. According to the disclosure, this surface region is between 0.3 cm$^2$ and 7 cm$^2$, typically between 0.5 cm$^2$ and 6 cm$^2$, more typically between 0.8 cm$^2$ and 5 cm$^2$ and, finally, even more typically between 1 cm$^2$ and 4 cm$^2$.

The part of the spectacle lens defined by the fourth partial grid is determined by the totality of the volumes of the volume elements $14a, 14b$ in the present exemplary embodiment. Expressed differently, the region of the spectacle lens defined by the fourth partial grid, which is designed for vision at a fourth object distance and through which the spectacle wearer gazes for the purposes of seeing an object arranged at this distance in focus in the case of intended use, is determined in the present exemplary embodiment by the totality of the object-side (and eye-side) surfaces of the volume elements $14a, 14b$. According to the disclosure, this surface region is between 0.3 cm$^2$ and 7 cm$^2$, typically between 0.5 cm$^2$ and 6 cm$^2$, more typically between 0.8 cm$^2$ and 5 cm$^2$ and, finally, even more typically between 1 cm$^2$ and 4 cm$^2$.

From a macroscopic point of view, the surface region defined by the first partial grid, the surface region defined by the second partial grid, the surface region defined by the third partial grid, and the surface region defined by the fourth partial grid coincide, and so there is no macroscopic separation between the part of the spectacle lens designed for the first object distance, the part of the spectacle lens designed for the second object distance, the part of the spectacle lens designed for the third object distance, and the part of the spectacle lens designed for the fourth object distance.

Figure 3:
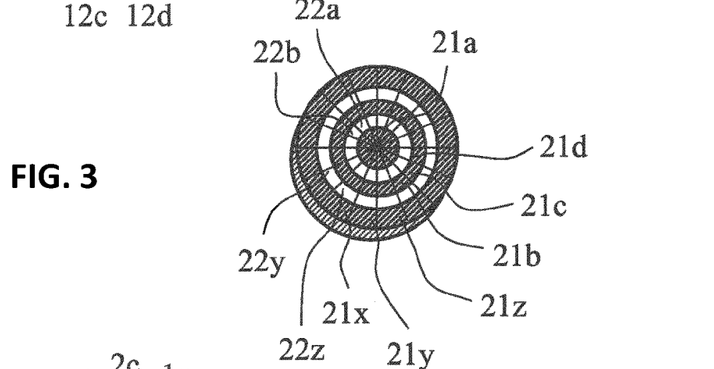
FIG. 3 shows a second exemplary embodiment for the arrangement of two partial grids formed by volume elements of the first and second volume element groups, displaced within one another in penetrative fashion.

FIG. 3 shows a second exemplary embodiment for the arrangement of two partial grids formed by volume elements of the first and second volume element groups, displaced within one another in penetrative fashion. The first partial grid, which is based on the volume elements $21a$, $21b$, $21c$, $21d$ ... $21x$, $21y$, $21z$, comprises a cylindrical volume element $21a$ and a plurality of ring-segment-shaped volume elements $21b$, $21c$, $21d$, ... $21x$, $21y$, $21z$. The second partial grid only comprises a plurality of ring-segment-shaped volume elements $22a$, $22b$, $22y$, $22z$. Like the exemplary embodiments shown in FIGS. 2 and 3, all volume elements $21b$, $21c$, $21d$, ... $21x$, $21y$, $21z$, $22a$, $22b$, $22y$, $22z$ are arranged in one plane.

Figure 4:
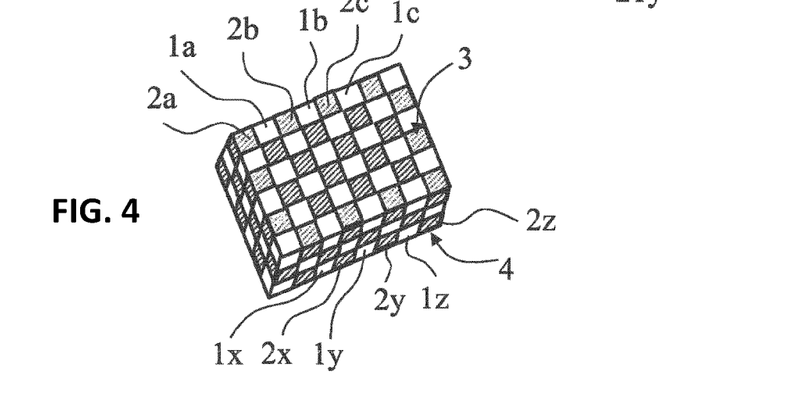
FIG. 4 shows a third exemplary embodiment for the arrangement of two partial grids formed by volume elements of the first and second volume element groups, displaced within one another in penetrative fashion.

FIG. 4 shows a third exemplary embodiment for the arrangement of two partial grids formed by volume elements of the first and second volume element groups, displaced within one another in penetrative fashion.

In the present exemplary embodiment, the first partial grid that is based on the cuboid volume elements $1a$, $1b$, $1c$ ... $1x$, $1y$, $1z$ and the second partial grid that is based on the cuboid volume elements $2a$, $2b$, $2c$ ... $2y$, $2z$ having an identical shape. Both partial grids represent a sequence of three-dimensional cubic structures, the respective volume elements $21b$, $21c$, $21d$, ... $21x$, $21y$, $21z$, $22a$, $22b$, $22y$, $22z$ of which are arranged adjacent to one another and within one another, penetrating one another in each case. Accordingly, the final grid comprises a plurality of layers of the type shown in FIG. 1. In the present case, let the surface 3 visible in FIG. 1 be the surface facing the object in the case of an intended use of the spectacle lens, which is based on the structure shown in FIG. 1. Accordingly, the surface 4 that is not visible in FIG. 1 in that case is the surface facing the eye of the spectacle wearer in the case of an intended use of the spectacle lens.

The part of the spectacle lens defined by the first partial grid is determined by the totality of the volumes of the cuboid volume elements $1a$, $1b$, $1c$ ... $1x$, $1y$, $1z$ in the present exemplary embodiment. Expressed differently, the region of the spectacle lens defined by the first partial grid, which is designed for vision at a first object distance and through which the spectacle wearer gazes for the purposes of seeing an object arranged at this distance in focus in the case of intended use, is determined in the present exemplary embodiment by the totality of the object-side (and eye-side) surfaces of the cuboid volume elements $1a$, $1b$, $1c$ (i.e., all blackened areas of the surface 3). According to the disclosure, this surface region is between 0.3 cm² and 7 cm², typically between 0.5 cm² and 6 cm², more typically between 0.8 cm² and 5 cm² and, finally, even more typically between 1 cm² and 4 cm².

The part of the spectacle lens defined by the second partial grid is determined by the totality of the volumes of the cuboid volume elements $2a$, $2b$, $2c$ ... $2x$, $2y$, $2z$ in the present exemplary embodiment. Expressed differently, the region of the spectacle lens defined by the second partial grid, which is designed for vision at a second object distance and through which the spectacle wearer gazes for the purposes of seeing an object arranged at this distance in focus in the case of intended use, is determined in the present exemplary embodiment by the totality of the object-side (and eye-side) surfaces of the cuboid volume elements $2a$, $2b$, $2c$ (i.e., all white areas of the surface 3). According to the disclosure, this surface region is between 0.3 cm² and 7 cm², typically between 0.5 cm² and 6 cm², more typically between 0.8 cm² and 5 cm² and, finally, even more typically between 1 cm² and 4 cm².

From a macroscopic point of view, the surface region defined by the first partial grid (i.e., all blackened areas of the surface 3) and the surface region defined by the second partial grid (i.e., all white areas of the surface 3) coincide, and so there is no macroscopic separation between the part of the spectacle lens designed for the first object distance and the part of the spectacle lens designed for the second object distance. In contrast to the conventional type of bifocal or varifocal lens that is designed for a presbyopic wearer, near and far part coincide from the macroscopic point of view.

Particularly in the case where the object-side and eye-side surfaces 3, 4 of the first and second parts of the spectacle lens form plane surfaces, a design for different object distances can be realized exclusively by a corresponding variation in the refractive index. Accordingly, GRIN structures that are nested in one another are required. Instead of or in addition to appropriately adapted refractive index variations, it is also possible to produce nested focal regions using volume elements, whose object-side and/or eye-side surfaces are embodied with the necessary curvature.

The structure shown in FIG. 4 represents a very complex system because the foci of the different materials influence one another again with each layer. This structure is of interest if single vision lenses are considered. Then, these 3D checkerboard patterns could be used at the edge. Since 3D printers can only print in binary fashion, i.e., only one or the other material, "smooth substance changes" must be realized by sufficiently small volume elements.

FIGS. 5A and 5B show a fourth exemplary embodiment for the arrangement of two partial grids formed by volume elements of the first and second volume element groups, displaced within one another in penetrative fashion. FIG. 5A shows the basic arrangement of the volume elements $51a$, $51b$, ... $51t$, $51u$, $52a$, $52b$, $52c$, ... $52t$, $52u$ in the style of a checkerboard pattern, as described in detail above in relation to FIG. 1. Deviating from the exemplary embodiment according to FIG. 1 (or optionally in addition thereto as well), in which the individual volume elements are designed by the corresponding variation of the refractive index in such a way that fusing parts that facilitate in-focus vision for different object distances arise, volume elements $51a$, $51b$, ... $51t$, $51u$, $52a$, $52b$, $52c$, ... $52t$, $52u$ whose object-side surfaces (and optionally eye-side surfaces, too) have different curvatures such that neighboring first and second volume elements adjoin one another not continuously but at an angle and optionally with jumps are included in the exemplary embodiment according to FIGS. 5A and 5B, wherein FIG. 5B shows a magnified illustration of in each case one of the first and second volume elements $52c$ and $52i$, which have object-side surfaces $53c$ and $54c$ that have a different curvature at the transition at which two neighboring first and second volume elements adjoin one another.

Figure 6:
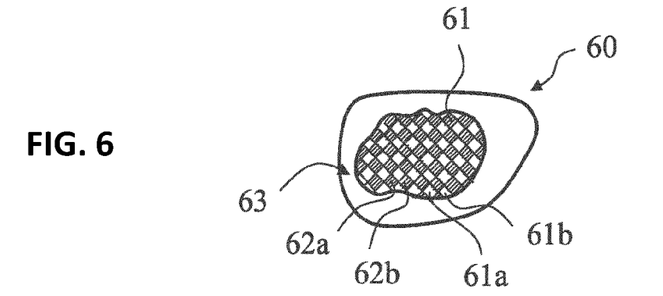
FIG. 6 shows a schematic sketch of a first exemplary embodiment of a spectacle lens according to the disclosure in a plan view from the object side.

FIG. 6 shows a first exemplary embodiment of a spectacle lens 60 in a plan view from the object side in the form of a schematic sketch. The visible surface is denoted by the reference sign 63. The exemplary embodiment has a region 61, which is embodied in the form according to the disclosure. It is possible to see a nested arrangement of two partial grids in the style of a checkerboard pattern, as shown in FIG. 1. Volume elements of the first partial grid are denoted in exemplary fashion by reference signs 61a, 61b and volume elements of the second partial grid are denoted in exemplary fashion by reference signs 62a, 62b.

According to the disclosure, the region 61 is configured for in-focus vision at two different object distances.

Figure 7:
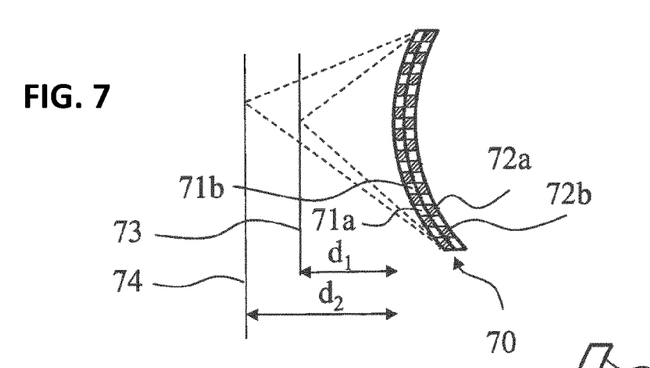
FIG. 7 shows a schematic sketch of a second exemplary embodiment of a spectacle lens according to the disclosure in cross section.

FIG. 7 shows a second exemplary embodiment of a spectacle lens 70 in cross section (schematic sketch). In this exemplary embodiment, the entire spectacle lens 70 includes a first volume element group with a plurality of first volume elements 71a, 71b, which are arranged in the style of grid points of a geometric grid, forming a first partial grid, and of a second volume element group with a plurality of second volume elements 72a, 72b, which are arranged in the style of grid points of a geometric grid, forming a second partial grid. In principle, the exemplary embodiment corresponds to the arrangement of the two partial grids in relation to one another as shown in FIG. 4.

Together, the first volume elements 71a, 71b form a first part of the spectacle lens, which has the dioptric power for vision at a first object distance. Together, the second volume elements form a second part of the spectacle lens, which has the dioptric power for vision at a second object distance that differs from the first object distance. Since the first volume element group and the second volume element group penetrate one another, they form a common macroscopic viewing region that facilitates, firstly, in-focus vision of an object arranged at the first object distance $d_1$ and in-focus vision of an object arranged at a second object distance $d_2$. The corresponding focal planes are denoted by reference signs 73 and 74 in the drawing.

Figure 8:
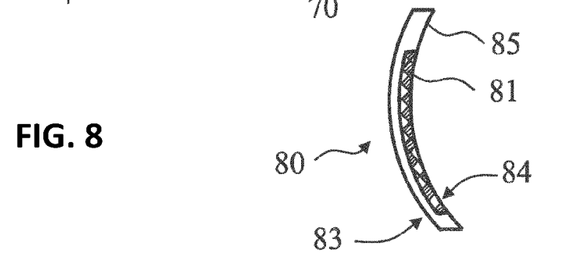
FIG. 8 shows a schematic sketch of a third exemplary embodiment of a spectacle lens according to the disclosure in cross section.

FIG. 8 shows a third exemplary embodiment of a spectacle lens 80 in cross section (as a schematic sketch). In this exemplary embodiment, the structure 81 according to the disclosure is applied to the back side (eye side) 84 of a transparent carrier 85 in the form of a buried structure. The front side (object side) 83 of the spectacle lens 80 can have a spherical, toric, rotationally symmetric aspherical, or aspherical shape (e.g., as a free-form surface).

Figure 9:
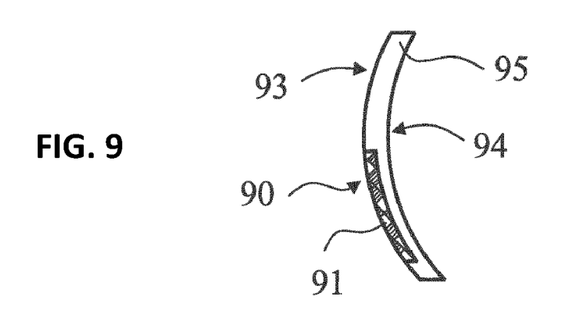
FIG. 9 shows a schematic sketch of a fourth exemplary embodiment of a spectacle lens according to the disclosure in cross section.

A fourth exemplary embodiment of a spectacle lens 90 in cross section (in the form of a schematic sketch) can be gathered from FIG. 9. In this exemplary embodiment, the structure 91 according to the disclosure is applied to the front side (object side) 93 of a transparent carrier 95 in the form of a buried structure. The back side (eye side) 94 of the spectacle lens 90 can have a spherical, toric, or aspherical shape (e.g., as a free-form surface).

Coatings, such as, for example, hard coats, antireflection coatings, lotus-effect-type coatings and the like, can be applied to one or both optically effective surfaces 83, 84, 93, 94 of the spectacle lenses 80, 90.

Figure 10:
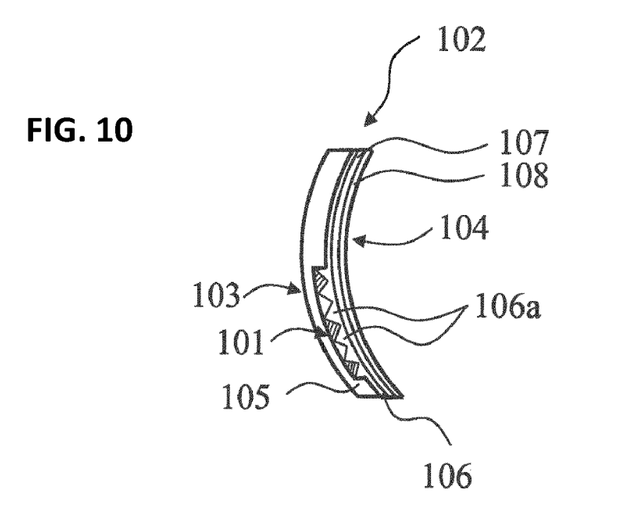
FIG. 10 shows a schematic sketch of a fifth exemplary embodiment of a spectacle lens according to the disclosure in cross section.

FIG. 10 shows a fifth exemplary embodiment of a spectacle lens 102 according to the disclosure in cross section in the form of a schematic sketch. In this exemplary embodiment, the structure 101 according to the disclosure is applied to a part of the back side (eye side) 104 of a transparent carrier 105 in the form of a buried structure. The front side (eye side) 103 of the spectacle lens 102 can have a spherical, toric, or aspherical shape (e.g., as a free-form surface). A smoothing hard coat 106 that also fills the interstices 106a of the buried structure, an adhesion promoter layer 107, and an antireflection coating 108 including a plurality of individual layers is applied to the buried structure 101.

Express reference is made herewith to the fact that structures 102 can also be applied to the carrier 105 on both the front and the back.

Figure 11:
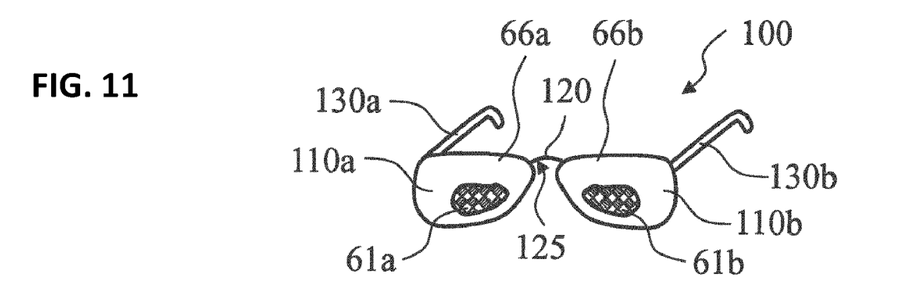
FIG. 11 shows an exemplary embodiment of spectacles with a spectacle lens according to the disclosure.

An exemplary embodiment of spectacles 100 with spectacle lenses 110a, 110b according to the disclosure can be gathered from FIG. 11. In addition to the two spectacle lenses 110a, 110b, the spectacles 100 comprise a spectacle frame 120 of which the bridge 125, and the two temples 130a, 130b are shown. Each spectacle lens 110a, 110b comprises a carrier 66a, 66b, each of which carries a structure 61a, 61b according to the disclosure of the type shown in FIG. 6. All constituent parts of the spectacles can be produced with the aid of a 3D printing method.

In summary, the concept of the disclosure includes constructing a three-dimensional structure using a manufacturing method (e.g., polyjet printing) that allows controlling the dioptric power of the spectacle lens, in particular controlling the refractive index for each individual volume element and the relative orientation of the surfaces of the volume elements, the far and near regions of the three-dimensional structure being present nested in one another. The change from one focus to the next can be implemented gradually or with a jump. In the first case, small transition zones arise, the transition zones having similar properties to the progression channel in the case of a conventional varifocal lens and the optical properties connected therewith. Secondly, the change in properties can be implemented with a jump by changing the material or changing the orientation of the optical surface.

The surface elements can be arranged as desired. By way of non-limiting example, the surface elements can be arranged as a checkerboard, as hexagons, or as concentric circles.

In an exemplary embodiment, the discontinuous of the surfaces can be embodied as buried structures having two materials, which, firstly, substantially simplifies the subsequent hard and antireflection coating (it is possible to use conventional smoothing hard coat systems) and, secondly, the discontinuities of the surfaces do not form cavities for subsequent accumulation of dirt on the surface.

This yields various combinations of optical surfaces:
two discontinuous surfaces on the front and back side,
one discontinuous surface on the front or back side, together with a spherical, toric, or aspherical (free-form) surface on the other side of the lens.

Which combination yields the ideal correction emerges from the combination of the individual parameters (spherical, astigmatic, prismatic power, addition, etc.) with the possibilities of the different surface properties.

The hard coat must be set in such a way that the edges of the optically effective surfaces are not smoothed or not smoothed any more than what is absolutely unavoidable. If the change in the refractive power is provided by way of the refractive index of the material, possible arrangements can be found in the patent applications WO 2015/014381 A1 and WO 2014/179780 A1. If the desired power difference (addition) between two or more surface elements is insufficient to obtain the desired effect when only one of the two principles (material variation versus discontinuous surface) is applied, it is possible to combine the two approaches with one another.

The spectacle lens typically includes the conventional finishing, hard coating, and antireflection coating. Transferring the approaches according to the disclosure to hybrid lenses lends itself as a possible exemplary embodiment. A precondition is the availability of a preformed carrier of the structure according to the disclosure that fits to the surface of the spectacle lens.

Further aspects of the disclosure in the form of clauses within the meaning of decision J15/81 of the Legal Board of Appeal of the European Patent Office are presented below:

Clause 1. A spectacle lens (60, 70, 80, 90, 102, 110a, 110b), comprising a first volume element group, wherein the first volume element group comprises a plurality of first volume elements (1a, 1b, . . . ; 11a, 11b, . . . ; 51a, 51b, . . . ; 61a, 61b; 71a, 71b), wherein the plurality of first volume elements (1a, 1b, . . . ; 11a, 11b, . . . ; 51a, 51b, . . . ; 61a, 61b; 71a, 71b) are arranged in the style of grid points of a geometric grid so as to form a first partial grid, wherein the first volume elements (1a, 1b, . . . ; 11a, 11b, . . . ; 51a, 51b, . . . ; 61a, 61b; 71a, 71b) together form a first part of the spectacle lens (60, 70, 80, 90, 102, 110a, 110b), the first part of the spectacle lens having the dioptric power for vision at a first object distance ($d_1$), a second volume element group, wherein the second volume element group comprises a plurality of second volume elements (2a, 2b, . . . ; 12a, 12b, . . . ; 52a, 52b, . . . ; 62a, 62b; 72a, 72b), wherein the plurality of second volume elements (2a, 2b, . . . ; 12a, 12b, . . . ; 52a, 52b, . . . ; 62a, 62b; 72a, 72b) are arranged in the style of grid points of a geometric grid so as to form a second partial grid, wherein the second volume elements (2a, 2b, . . . ; 12a, 12b, . . . ; 52a, 52b, . . . ; 62a, 62b; 72a, 72b) together form a second part of the spectacle lens (60, 70, 80, 90, 110a, 110b), the second part of the spectacle lens having dioptric power for vision at a second object distance ($d_2$) that differs from the first object distance ($d_1$), i) characterized in that the first partial grid and the second partial grid are arranged within one another, penetrating one another in each case.

Clause 2. The spectacle lens (60, 70, 80, 90, 102, 110a, 110b) according to clause 1, characterized in that the first volume elements (1a, 1b, . . . ; 11a, 11b, . . . ; 51a, 51b, . . . ; 61a, 61b; 71a, 71b) consist of a first material and in that the second volume elements (2a, 2b, . . . ; 12a, 12b, . . . ; 52a, 52b, . . . ; 62a, 62b; 72a, 72b) consist of a second material that differs from the first material.

Clause 3. The spectacle lens (60, 70, 80, 90, 102, 110a, 110b) according to either of clauses 1 and 2, characterized in that the first material has a first refractive index and in that the second material has a second refractive index that differs from the first refractive index.

Clause 4. The spectacle lens (60, 70, 80, 90, 102, 110a, 110b) according to any one of the preceding clauses, characterized in that the first volume elements (51a, 51b, 51i, 51t, 51u) each have a first surface element (54c) and in that the second volume elements (52a, 52b, 52c, 52t, 52u) each have a second surface element (53c) and in that respectively one of the first surface elements (54c) and respectively one of the second surface elements (53c), which adjoin one another, are arranged at an angle to one another.

Clause 5. The spectacle lens (60, 102, 110a, 110b) according to any one of the preceding clauses, characterized in that the first partial grid has a two-dimensional shape and/or in that the second partial grid has a two-dimensional shape.

Clause 6. The spectacle lens (70, 80, 90) according to any one of the preceding clauses, characterized in that the first partial grid has a three-dimensional shape and/or in that the second partial grid has a three-dimensional shape.

Clause 7. The spectacle lens (60, 70, 80, 90, 102, 110a, 110b) according to any one of the preceding clauses, characterized in that the first object distance ($d_1$) differs from the second object distance ($d_2$) by more than a value from the group of 10 cm, 15 cm, 20 cm, 30 cm and 50 cm.

Clause 8. The spectacle lens (60, 80, 90, 102, 110a, 110b) according to any one of the preceding clauses, characterized in that the first volume element group and the second volume element group are arranged on a surface of a carrier (85, 95, 105, 66a, 66b).

Clause 9. The spectacle lens (60, 80, 90, 102, 110a, 110b) according to clause 8, characterized in that the carrier (85) has an object-side spherical or toric or free-form surface and in that the surface on which the first volume element group and the second volume element group are arranged is the eye-side surface of the carrier (85), or in that the carrier (95, 105) has an eye-side spherical or toric or free-form surface and in that the surface (104) on which the first volume element group and the second volume element group are arranged is the object-side surface of the carrier (95, 105), or in that the surface on which the first volume element group and the second volume element group are arranged is the eye-side and/or the object-side surface of the carrier.

Clause 10. The spectacle lens (60, 80, 90, 102, 110a, 110b) according to either of clauses 8 and 9, characterized in that the carrier (85, 95, 105, 66a, 66b) has a refractive index gradient.

Clause 11. The spectacle lens (60, 70, 80, 90, 102, 110a, 110b) according to any one of the preceding clauses, characterized in that a coat (106, 106a, 107, 108) is arranged on the first volume element group and the second volume element group.

Clause 12. The spectacle lens (60, 70, 80, 90, 102, 110a, 110b) according to any one of the preceding clauses, characterized in that the first volume elements (1a, 1b, . . . ; 11a, 11b, . . . ; 51a, 51b, . . . ; 61a, 61b; 71a, 71b) each have a volume of between 1000 μm$^3$ and 1 mm$^3$ and/or in that the second volume elements (2a, 2b, . . . ; 12a, 12b, . . . ; 52a, 52b, . . . ; 62a, 62b; 72a, 72b) each have a volume of between 1000 μm$^3$ and 1 mm$^3$.

Clause 13. The spectacle lens (60, 70, 80, 90, 102, 110a, 110b) according to clause 12, characterized in that the first volume elements (1a, 1b, . . . ; 11a, 11b, . . . ; 51a, 51b, . . . ; 61a, 61b; 71a, 71b) each have an object-side surface of between 100 μm$^2$ and 1 mm$^2$ and/or in that the second volume elements (2a, 2b, . . . ; 12a, 12b, . . . ; 52a, 52b, . . . ; 62a, 62b; 72a, 72b) each have an object-side surface of between 100 μm$^2$ and 1 mm$^2$, and/or in that the first volume elements (1a, 1b, . . . ; 11a, 11b, . . . ; 51a, 51b, . . . ; 61a, 61b; 71a, 71b) each have an eye-side surface of between 100 μm$^2$ and 1 mm$^2$ and/or in that the second volume elements (2a, 2b, . . . ; 12a, 12b, . . . ; 52a, 52b, . . . ; 62a, 62b; 72a, 72b) each have an eye-side surface of between 100 μm$^2$ and 1 mm$^2$.

Clause 14. A method for producing a spectacle lens (60, 70, 80, 90, 102, 110a, 110b), including the steps of:

additive manufacturing of a first volume element group, wherein the first volume element group comprises a plurality of first volume elements (1a, 1b, . . . ; 11a, 11b, . . . ; 51a, 51b, . . . ; 61a, 61b; 71a, 71b), wherein the plurality of first volume elements (1a, 1b, . . . ; 11a, 11b, . . . ; 51a, 51b, . . . ; 61a, 61b; 71a, 71b) are arranged in the style of grid points of a geometric grid so as to form a first partial grid, wherein the first volume elements (1a, 1b, . . . ; 11a, 11b, . . . ; 51a, 51b, . . . ; 61a, 61b; 71a, 71b) together form a first part of the spectacle lens (60, 70, 80, 90, 110a, 110b), the first part of the spectacle lens having the dioptric power for vision at a first object distance ($d_1$), additive manufacturing of a second volume element group, wherein the second volume element group comprises a plurality of second volume elements (2a, 2b, . . . ; 12a, 12b, . . . ; 52a, 52b, . . . ; 62a, 62b; 72a, 72b), wherein the plurality of second volume elements (2*a*, 2*b*, . . . ; 12*a*, 12*b*, . . . ; 52*a*, 52*b*, . . . ; 62*a*, 62*b*; 72*a*, 72*b*) are arranged in the style of grid points of a geometric grid so as to form a second partial grid, wherein the second volume elements (2*a*, 2*b*, . . . ; 12*a*, 12*b*, . . . ; 52*a*, 52*b*, . . . ; 62*a*, 62*b*; 72*a*, 72*b*) together form a second part of the spectacle lens (60, 70, 80, 90, 110*a*, 110*b*), the second part of the spectacle lens having the dioptric power for vision at a second object distance ($d_2$) that differs from the first object distance ($d_1$),
i) characterized in that
the first partial grid and the second partial grid are arranged within one another, penetrating one another in each case, during the additive manufacturing.

Clause 15. The method according to clause 14, characterized by the step of:
additive manufacturing of a carrier (66*a*, 66*b*) with a surface (104), on which the first volume element group and the second volume element group are arranged.

The foregoing description of the exemplary embodiments of the disclosure illustrates and describes the present invention. Additionally, the disclosure shows and describes only the exemplary embodiments but, as mentioned above, it is to be understood that the disclosure is capable of use in various other combinations, modifications, and environments and is capable of changes or modifications within the scope of the concept as expressed herein, commensurate with the above teachings and/or the skill or knowledge of the relevant art.

The term "comprising" (and its grammatical variations) as used herein is used in the inclusive sense of "having" or "including" and not in the exclusive sense of "consisting only of." The terms "a" and "the" as used herein are understood to encompass the plural as well as the singular.

All publications, patents and patent applications cited in this specification are herein incorporated by reference, and for any and all purposes, as if each individual publication, patent or patent application were specifically and individually indicated to be incorporated by reference. In the case of inconsistencies, the present disclosure will prevail.

The invention claimed is:

1. A spectacle lens comprising:
a first volume element group, wherein the first volume element group includes a plurality of first volume elements, wherein the plurality of first volume elements is arranged on grid points of a geometric grid to form a first partial grid, wherein the first volume elements are configured to jointly form a first part of the spectacle lens having a dioptric power for vision at a first object distance; and
a second volume element group, wherein the second volume element group includes a plurality of second volume elements, wherein the plurality of second volume elements is arranged on the grid points of the geometric grid to form a second partial grid, wherein the second volume elements are configured to jointly form a second part of the spectacle lens having a dioptric power for vision at a second object distance that differs from the first object distance,
wherein the first partial grid and the second partial grid are arranged to penetrate one another, wherein the first volume elements are made from a first material and the second volume elements are made from a second material that differs from the first material,
wherein a transition between one of the first volume elements and an adjoining one of the second volume elements is implemented by a gradual change in the material of the first and second volume elements that adjoin one another, and
wherein each first volume element from among the first volume element group has a volume of between 1000 $\mu m^3$ and 1 $mm^3$, wherein each second volume element from among the second volume element group has a volume of between 1000 $\mu m^3$ and 1 $mm^3$, or wherein each first volume element from among the first volume element group and each second volume element from among the second volume element group has a volume of between 1000 $\mu m^3$ and 1 $mm^3$.

2. The spectacle lens as claimed in claim 1, wherein the first material has a first refractive index and wherein the second material has a second refractive index that differs from the first refractive index.

3. The spectacle lens as claimed in claim 1, wherein at least one of the first partial grid or the second partial grid is two-dimensional.

4. The spectacle lens as claimed in claim 1, wherein at least one of the first partial grid or the second partial grid is three-dimensional.

5. The spectacle lens as claimed in claim 1, wherein the first object distance differs from the second object distance by more than 10 cm.

6. The spectacle lens as claimed in claim 5, wherein the first object distance differs from the second object distance by more than 20 cm.

7. The spectacle lens as claimed in claim 5, wherein the first object distance differs from the second object distance by more than 30 cm.

8. The spectacle lens as claimed in claim 5, wherein the first object distance differs from the second object distance by more than 40 cm.

9. The spectacle lens as claimed in claim 5, wherein the first object distance differs from the second object distance by more than 50 cm.

10. The spectacle lens as claimed in claim 1, wherein the first volume element group and the second volume element group are arranged on a surface of a carrier.

11. The spectacle lens as claimed in claim 10, wherein:
the carrier has an object-side spherical or toric or free-form surface and the surface on which the first volume element group and the second volume element group are arranged is the eye-side surface of the carrier, or
the carrier has an eye-side spherical or toric or free-form surface and the surface on which the first volume element group and the second volume element group are arranged is the object-side surface of the carrier, or
the surface on which the first volume element group and the second volume element group are arranged is the eye-side and/or the object-side surface of the carrier.

12. The spectacle lens as claimed in claim 10, wherein the carrier has a refractive index gradient.

13. The spectacle lens as claimed in claim 1 further comprising:
a coat arranged on the first volume element group and the second volume element group.

14. The spectacle lens as claimed in claim 1, wherein at least one of:
the first volume elements each have an object-side surface area of between 100 $\mu m^2$ and 1 $mm^2$,
the second volume elements each have an object-side surface area of between 100 $\mu m^2$ and 1 $mm^2$,
the first volume elements each have an eye-side surface area of between 100 $\mu m^2$ and 1 $mm^2$, or
the second volume elements each have an eye-side surface of between 100 $\mu m^2$ and 1 $mm^2$.

15. A spectacle lens comprising:
a first volume element group, wherein the first volume element group includes a plurality of first volume elements, wherein the plurality of first volume elements is arranged on grid points of a geometric grid to form a first partial grid, wherein the first volume elements are configured to jointly form a first part of the spectacle lens having a dioptric power for vision at a first object distance; and
a second volume element group, wherein the second volume element group includes a plurality of second volume elements, wherein the plurality of second volume elements is arranged on the grid points of the geometric grid to form a second partial grid, wherein the second volume elements are configured to jointly form a second part of the spectacle lens having a dioptric power for vision at a second object distance that differs from the first object distance,
wherein the first partial grid and the second partial grid are arranged to penetrate one another,
wherein each first volume element has a first surface element and each second volume element has a second surface element,
wherein respectively one of the first surface elements and respectively one of the second surface elements, which adjoin one another, are arranged at an angle to one another or arranged to form a step, and
wherein each first volume element from among the first volume element group has a volume of between 1000 $\mu m^3$ and 1 $mm^3$, wherein each second volume element from among the second volume element group has a volume of between 1000 $\mu m^3$ and 1 $mm^3$, or wherein each first volume element from among the first volume element group and each second volume element from among the second volume element group has a volume of between 1000 $\mu m^3$ and 1 $mm^3$.

16. The spectacle lens as claimed in claim 15, wherein the first volume elements are made of a first material and wherein the second volume elements are made of a second material that differs from the first material.

17. A spectacle lens comprising:
a first volume element group, wherein the first volume element group includes a plurality of first volume elements, wherein the plurality of first volume elements is arranged on grid points of a geometric grid to form a first partial grid, wherein the first volume elements are configured to jointly form a first part of the spectacle lens having a dioptric power for vision at a first object distance; and a second volume element group, wherein the second volume element group includes a plurality of second volume elements, wherein the plurality of second volume elements is arranged on the grid points of the geometric grid to form a second partial grid, wherein the second volume elements are configured to jointly form a second part of the spectacle lens having a dioptric power for vision at a second object distance that differs from the first object distance, wherein the first partial grid and the second partial grid are arranged to penetrate one another, wherein each first volume element has a first surface element and each second volume element has a second surface element, wherein a transition between one of the first volume elements and an adjoining one of the second volume elements is implemented by a gradual change of an orientation of the respective first and second surface elements, adjoining one another, of the first and second volume elements that adjoin one another, and wherein each first volume element from among the first volume element group has a volume of between 1000 $\mu m^3$ and 1 $mm^3$, wherein each second volume element from among the second volume element group has a volume of between 1000 $\mu m^3$ and 1 $mm^3$, or wherein each first volume element from among the first volume element group and each second volume element from among the second volume element group has a volume of between 1000 $\mu m^3$ and 1 $mm^3$.

* * * * *